United States Patent

[11] 3,580,129

| [72] | Inventors | Eric R. Austin<br>Coventry;<br>Eric G. Bill, Solihull, England |
|---|---|---|
| [21] | Appl. No. | 756,458 |
| [22] | Filed | Aug. 30, 1968 |
| [45] | Patented | May 25, 1971 |
| [73] | Assignee | B.S.A. Tools Limited<br>Birmingham, England |
| [32] | Priority | Sept. 1, 1967 |
| [33] | | Great Britain |
| [31] | | 40086/67 |

[54] PRESETTABLE TOOL ARRANGEMENTS FOR MACHINE TOOLS
2 Claims, 5 Drawing Figs.

[52] U.S. Cl. .................................................... 82/2, 77/25
[51] Int. Cl. ...................................................... B23b 3/00
[50] Field of Search........................................... 82/34.1,
34.2, 36.1, 36.2, 36, 37; 29/65; 77/25 (Inquired)

[56] References Cited
UNITED STATES PATENTS

| 1,075,253 | 10/1913 | Green............................. | 82/37 |
| 2,875,662 | 3/1959 | Poorman....................... | 82/36 |
| 2,986,056 | 5/1961 | Irwin et al..................... | 82/36 |
| 3,191,470 | 6/1965 | Pabst et al. .................. | 82/36(.1) |
| 3,333,493 | 8/1967 | Bullard III et al............. | 82/36 |

FOREIGN PATENTS

| 958,231 | 9/1949 | France ......................... | 82/36(.1) |
| 593,854 | 5/1959 | Italy ............................. | 82/36(.1) |

*Primary Examiner*—Leonidas Vlachos
*Attorney*—Holman and Stern

ABSTRACT: A presettable tool arrangement incorporates a tool holder with a dovetail slide portion for slidably engaging a dovetail guideway on a tool mount. An adjustable abutment rod on the tool holder engages an abutment on the tool mount for accurately positioning the preset tool holder on the tool mount.

PATENTED MAY 25 1971 3,580,129

INVENTOR
Eric Ronald Austin
Eric Graham Bill
BY
ATTORNEY

PRESETTABLE TOOL ARRANGEMENTS FOR MACHINE TOOLS

This invention relates to presettable tool arrangements for machine tools and has as an object to provide a convenient form of tool holder which can be preset for accurate location on a tool mount forming part of a machine tool.

A tool holder in accordance with the invention incorporates a slide portion which can be interengaged with a complementary part of a tool mount so as to locate the tool holder in a manner to permit sliding of the tool holder in one direction but prevent movement thereof in directions perpendicular to said one direction, an adjustable abutment member which is adjustable in a direction parallel to said one direction and adapted to abut a coacting abutment on the tool mount and clamping means associated with said slide portion for locking the tool holder on the tool mount independently of said abutment.

The invention also resides in the combination of a tool mount having a guideway and an abutment at one end of said guideway, with a tool holder comprising a slide movable along said guideway, an adjustable abutment projecting from said slide into engagement with said abutment on the tool mount, said adjustable abutment being adjustable in a direction parallel to the length of the guideway, and clamping means for claiming the slide to the guideway independently of said interengaged abutments.

The machine shown is a lathe having a headstock A incorporating a control console providing manual controls on a panel B and having a tape control C. The headstock mounts on a horizontal spindle D driven by a motor E through variable speed gearing as is conventional.

The lathe has two turrets indexable about axes parallel to the spindle axis. One turret 10 is carried by a vertically movable slide F on guideways G on a saddle H movable on guides J in a direction parallel to the axis of the spindle D, by means of a ram K. The other turret 23 is carried on a saddle L on guides M movable in parallel to the spindle axis by a ram N. The control system provides two axis numerical control for the turret 10 and single axis numerical control for the turret 23.

Figure 1:
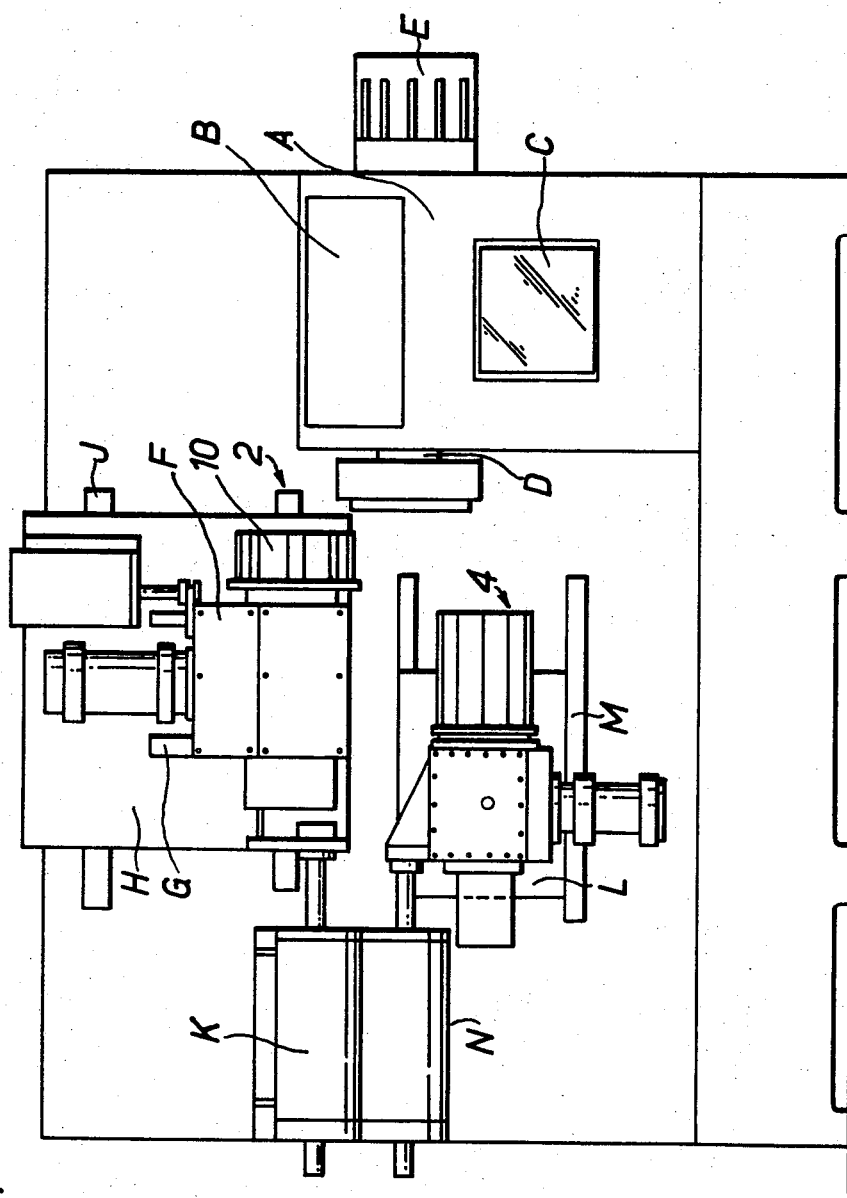
FIG. 1 is a somewhat simplified, diagrammatic elevation of an example of a machine tool incorporating presettable tool arrangements in accordance with the invention.
Figure 2:
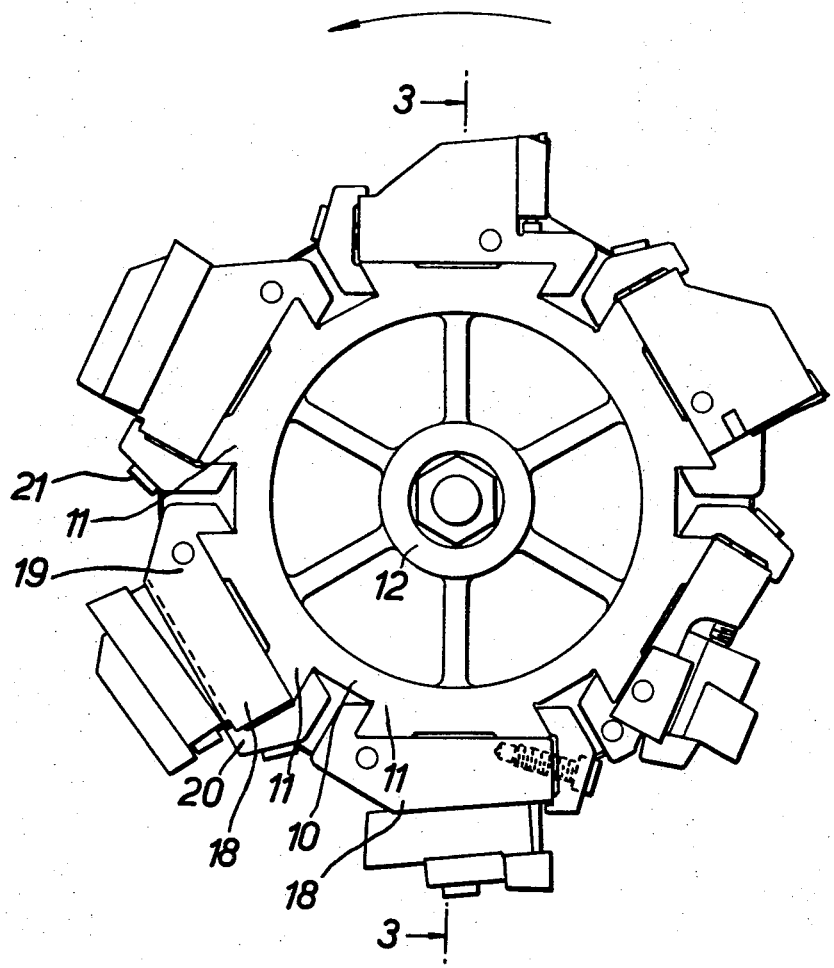
FIG. 2 is an enlarged elevation on arrow 2 in FIG. 1.
Figure 3:
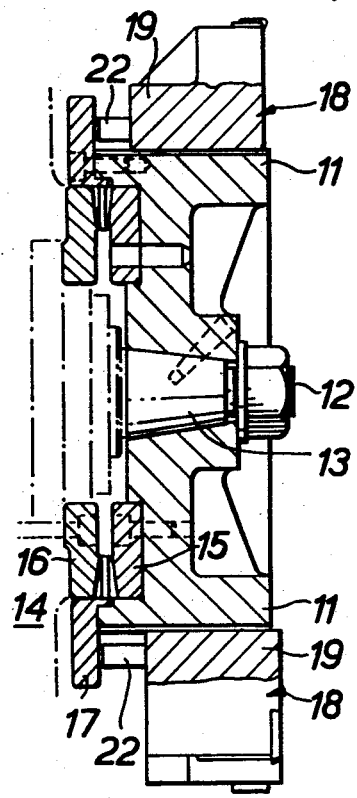
FIG. 3 is a section on line 3-3 in FIG. 2.

Referring now to FIGS. 2 and 3, the turret 10 has a plurality of identical dovetail guideways 11 which extend in a direction parallel to the rotary axis 12 of the turret. The turret is carried on the end of a shaft 13 which is rotatable and axially movable. The turret and the slide 14 on which it is rotatably mounted carry respectively a pair of toothed coupling rings 15, 16. For indexing, the shaft 13 is moved axially to disengage the toothed coupling rings, turned through one-sixth of a revolution and moved axially back to its original position to reengage the toothed coupling rings so as accurately to locate the turret in the new position.

Secured to the turret is an abutment ring 17 extending in a plane perpendicular to the dovetail guideways 11 and arranged at one axial end of the turret.

The tool holders 18 used on the turret vary considerably in individual design. Each, however, has certain features in common with the others. These features comprise a slide 19 and a clamp 20 attached to the slide by a clamping screw 21. The slide 19 and the clamp 20 form, in combination, a dovetail groove which is complementary to the dovetail guideway on the turret. In use, therefore, the tool holder is located on the guideway in such a manner as to permit movement of the tool holder axially relative to the turret but movement in directions perpendicular to the axis is prevented.

To assist in setting the tool holders at the correct axial position on the guideways 11, there is provided an elongated abutment in the form of a rod 22 which projects from the slide 19 towards the abutment ring 17. The rod 22 is slidable in a bore in the slide 19 in a direction parallel to the axis of the turret and can be locked by means of a screw or bolt (not shown).

In use the individual tool holders are preset on a presetting fixture (not shown). This fixture comprises a dummy guideway on which the tool holder is clamped. Slidably mounted on the guideway is a member with a pair of fixed abutments. This member is slid to a position in which one of the abutments thereon engages the working tip of the tool in the tool holder. The rod 22 is then slid to a position in which it engages the other abutment and is then clamped in position using the screw or bolt mentioned above. When the time comes for the tooling on the turret to be changed it is merely necessary for the existing tool holders to be removed and for the new tool holders to be slipped onto the guideways until the rod 22 engages the ring 17 and for the clamp 20 to be tightened. The tool holders are thereby all preset so that the working tips of the tools are always the same distance from the face of the ring 17. This makes programming of the numerical controller considerably simpler than is usual.

It should be noted that when the clamps 20 are tightened to lock the tool holders onto the guideways, the rod 22 will not be required to take any axial load.

Figure 4:
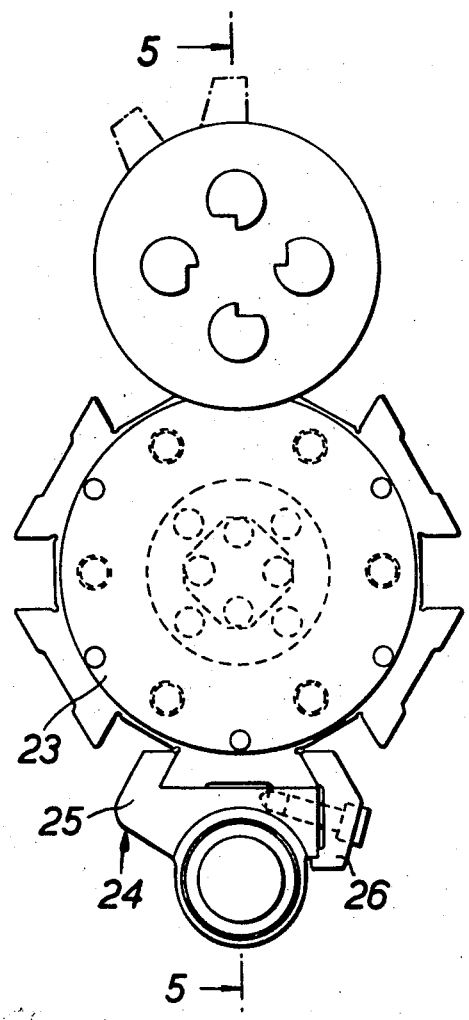
FIG. 4 is an enlarged elevation on arrow 4 in FIG. 1.
Figure 5:
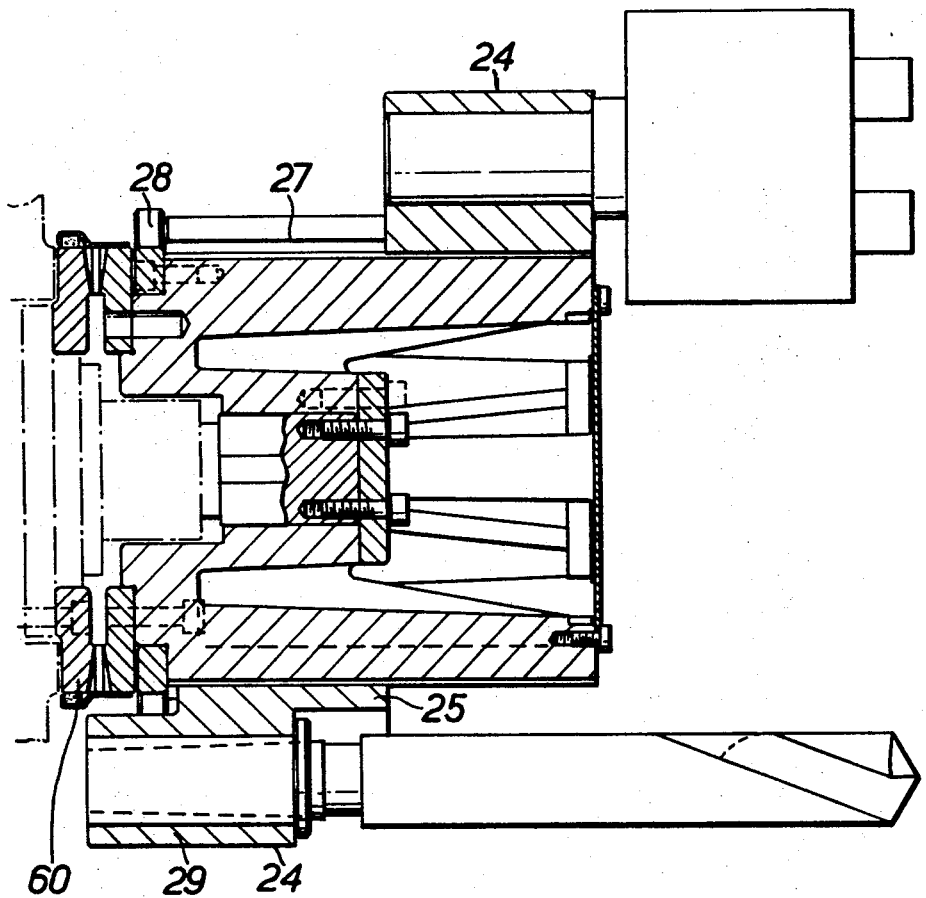
FIG. 5 is a section on line 5-5 in FIG. 4.

The turret 23 shown in FIGS. 4 and 5 is essentially similar to that shown in FIGS. 2 and 3 but there is provision for a greater range of axial adjustment of the tool holders 24. Once again, however, each tool holder comprises a slide 25, a clamp 26, and an adjustable abutment rod 27 which can engage an abutment ring 28 on the turret. Setting of the tools is accomplished in the same manner as is described above.

FIG. 4 shows, in fact, two different tool holder arrangements. The lower tool holder 24 has a tool receiving socket 29 which is offset rearwardly from the slide 25. In the upper tool holder 25 the socket and the slide are not offset. It may also be desirable to utilize tool holders in which the socket is offset forwardly from the slide.

We claim:

1. In a lathe, having a rotatable headstock spindle, the combination of a pair of tool turrets mounted on saddles movable relative to the headstock spindle, each turret being indexable about an axis parallel to the spindle axis and having a plurality of parallel guideways extending in a direction parallel to the spindle axis, a plurality of tool holders having slide portions slidable on said guideways and clamping means for clamping the tool holders to the guideways, and a plurality of presettable adjustable abutment members associated with the tool holders respectively, said abutment members being adjustable axially of the spindle and an abutment ring on the turret with which ring the abutment members are engageable to determine the positions of the working tips of tools carried by the respective tool holders, whereby the working tips of all the tools carried by each turret lie in a predetermined datum plane relative to the turret, the said plane being perpendicular to the axis of the spindle and the said working tips being equidistant from the abutment ring.

2. In a lathe the combination claimed in claim 1 in which each abutment member comprises an elongated rod slidable in a bore in the associated tool holder.